United States Patent Office 2,838,164
Patented June 10, 1958

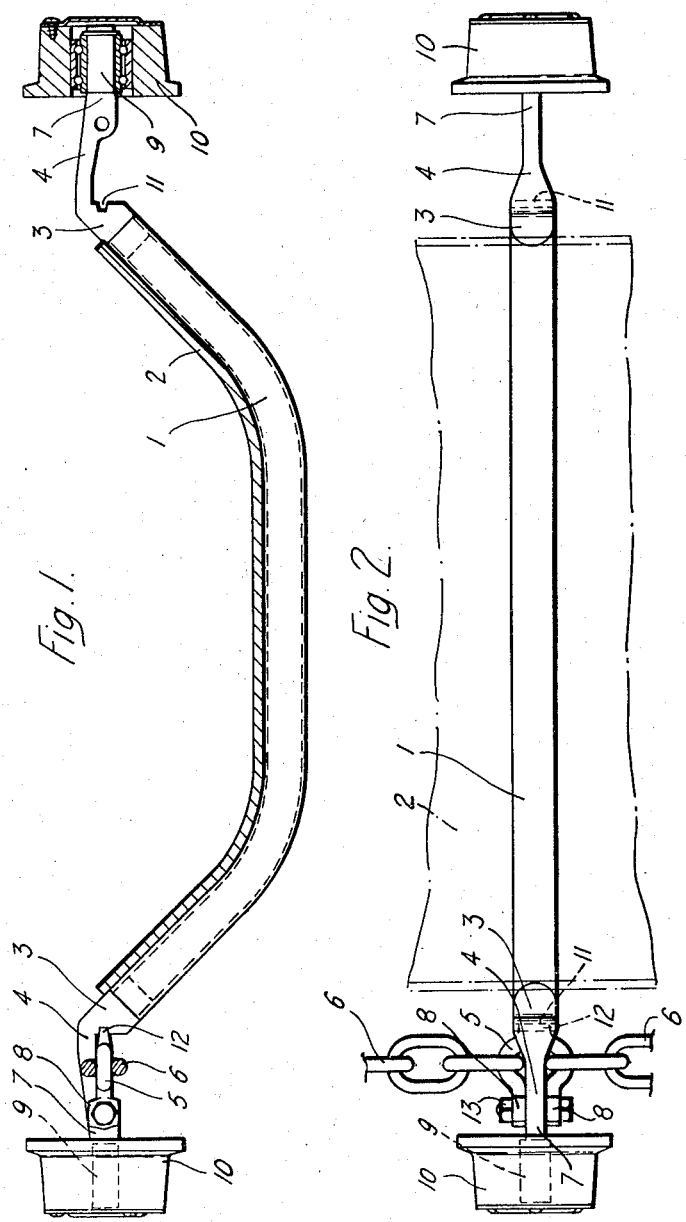

2,838,164

CONVEYORS

Angus W. Duncan, Worcester, England, assignor to The Mining Engineering Company Limited, Worcester, England Application March 1, 1955, Serial No. 491,423

Claims priority, application Great Britain March 9, 1954

3 Claims. (Cl. 198—191)

This invention relates to conveyors having separate tension and carrying mediums in which the carrying member comprises an endless belt carried on cross members attached to a pair of laterally disposed chains forming the tension member.

In my co-pending application No. 397,680, now abandoned, there is described an arrangement in which links connecting lengths of cable link chains form part of the cross member assembly and are interposed between wheels, arranged for running on rail tracks or the like, and the belt carrying portion of the cross member. This arrangement permits the chains to be flexed round driving sprockets or return wheels in either direction in the vertical plane.

The present invention provides a carrier cross member assembly for a conveyor having independent tension and carrying mediums comprising one continuous unit crossing and detachably connected to the cable link chains forming the tension element in such a manner that the tension element can be flexed round sprocket wheels in either direction in the vertical plane.

From one aspect, a carrier cross member in association with cable link chains used as the tension member of a conveyor and permitting the flexing of the chains round sprocket wheels in either direction in the vertical plane is, according to the invention, characterised by being continuous and detachably mounted on the chain connector links or specialy formed chain links incorporated in a continuous chain. Track wheels may be mounted in any convenient manner on the continuous carrier cross member.

From another aspect, a carrier cross member for a conveyor of the kind referred to is, according to the invention, formed at each end with portions adapted to span a link of the cable chain, said portions being formed to key with corresponding portions of the link and to be bolted to a lug (or between a pair of lugs) projecting from one side of the link.

The cross member may be formed with spindles on which the wheels may be mounted or such spindles may be detachably connected to the cross member.

The link may be split at one side and have projecting lugs at each side of the gap between which the cross member may be engaged so that the bolt fixing the cross member to the link also completes the closure of the link.

Other parts of the invention are embodied in the preferred forms which will now be described in some detail by way of example with reference to the accompanying drawings in which Fig. 1 is a side view of a carrier shown on one side cooperating with a chain and Fig. 2 is a plan view.

In this form, the carrier 1 is of trough form and is adapted to support a flexible belt 2 forming a load-carrying element. The carrier 1 is of tubular section and has mounted on it at each end a member 3. This member is formed with an extending portion 4 adapted in use to lie horizontally, pass centrally across the connecting link 5 of a cable link chain 6 and then to extend downwardly at 7 between laterally projecting lugs 8 of the connecting link. These extending portions 4 terminate in spindles 9 serving as mountings for the rollers 10. The members 3 may be forgings attached to the carrier member by welding, rivetting or the like. They are formed with recesses 11 to engage projecting keys 12 on the inward side of the connecting links 5.

The projecting lugs 8 of each connecting link are drilled to receive a bolt 13 to complete the link and this bolt also passes through a hole in the member 3 so arranged that the fitting of the bolt retains the key projection 12 of the link in engagement with the keyway 11 in the forging.

It will be understood that the carrier cross member assembly, comprising cranked carrier, forgings and wheels is a continuous rigid member independent of the chains and is detachably connected to the chains by engaging the key elements and fitting the bolts which complete the connecting links.

The conveyor tension element so formed, comprising cable link chains and carrier cross member assemblies, can be flexed round sprocket wheels in either direction in the vertical plane, the forged members of the carrier assemblies lying in recesses between the sprocket teeth which drive in known manner on the shoulders of the horizontal links of the chains.

In another form of the invention the carrier assemblies may be attached to complete chain links of suitable form in continuous chains and the rollers may be detachably mounted on the forgings forming part of the carrier cross member assemblies.

The rollers may be arranged either inside or outside the cable link chains or two rollers, one inside and one outside the chains may be used at each end of the carrier cross members. The roller spindles may be part of the cross member assemblies or they may be detachably mounted on the assemblies in known manner.

It will be understood that the invention is not restricted to the details of the preferred forms described by way of example which may be modified without departing from the broad ideas underlying them.

I claim:

1. In a conveyor comprising a load carrying element, an independent tension element comprising parallel cable link chains and cross members detachably connected to links of said chains, said cross members supporting said load carrying element, a carrier cross member assembly comprising a pair of cable links, a carrier member extending at its ends across each of the pair of cable links, means for detachably connecting the ends of the carrier member to the cable links and a key integral with the cable link engaging a recess in the carrier member.

2. In a conveyor comprising a load carrying element, an independent tension element comprising parallel cable link chains and cross members detachably connected to links of said chains, said cross members supporting said load carrying element, a carrier cross member assembly comprising a pair of cable links, a carrier member extending at its ends across each of the pair of cable links, means for detachably connecting the ends of the carrier member to the cable links, a key integral with the cable link engaging a recess in the carrier member and track wheels mounted at each end of said carrier member.

3. In a conveyor comprising a load carrying element, an independent tension element comprising parallel cable link chains and cross members detachably connected to links of said chains, said cross members supporting said load carrying element, a carrier cross member assembly comprising a pair of cable links, a carrier member extending at its ends across each of the pair of cable links, means for detachably connecting the ends of the carrier member to the cable links, a key integral with the cable link engaging a recess in the carrier member, said cable links being split to receive adjacent links of a cable link chain.

References Cited in the file of this patent

UNITED STATES PATENTS

| | | |
|---|---|---|
| 1,116,762 | Thornton et al. | Nov. 10, 1914 |
| 2,156,878 | De Los Sinden | May 2, 1939 |
| 2,286,332 | Bleyer | June 16, 1942 |

FOREIGN PATENTS

| | | |
|---|---|---|
| 470,298 | Germany | Jan. 10, 1929 |
| 1,059,196 | France | Nov. 10, 1953 |
| 1,067,342 | France | Jan. 27, 1954 |